(12) United States Patent
Sandeep et al.

(10) Patent No.: US 11,984,016 B2
(45) Date of Patent: *May 14, 2024

(54) PREDICTIVE ANALYTICS OF FIRE SYSTEMS TO REDUCE UNPLANNED SITE VISITS AND EFFICIENT MAINTENANCE PLANNING

(71) Applicant: Honeywell International Inc., Charlotte, NC (US)

(72) Inventors: Deepika Sandeep, Bangalore (IN); Jayaprakash Meruva, Bangalore (IN); Hariprasad Kozhikkotakathitta Veetil, Bangalore (IN); Rajesh Babu Nalukurthy, Bangalore (IN); Sundararaman Venkateswaran, Chennai (IN); Vishwanath Gupta, Ranchi (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/554,578

(22) Filed: Dec. 17, 2021

(65) Prior Publication Data
US 2023/0196904 A1 Jun. 22, 2023

(51) Int. Cl.
*G08B 29/12* (2006.01)
(52) U.S. Cl.
CPC .................... *G08B 29/12* (2013.01)
(58) Field of Classification Search
CPC ...... G08B 17/00; G08B 29/043; G08B 25/14; G08B 29/02; G08B 17/10
See application file for complete search history.

(56) References Cited

U.S. PATENT DOCUMENTS

| | | | |
|---|---|---|---|
| 9,978,256 B1 * | 5/2018 | Norton | G08B 25/14 |
| 10,339,793 B2 | 7/2019 | Moffa | |
| 10,359,771 B2 | 7/2019 | Trainor et al. | |
| 10,380,521 B2 | 8/2019 | Kapuschat et al. | |
| 11,598,544 B1 * | 3/2023 | Schubert | F24F 11/46 |

(Continued)

OTHER PUBLICATIONS

Fang, et al., "Data Collection with in-network Fault Detection Based on Spatial Correlation"; 2014 IEEE International Conference on Cloud and Autonomic Computing, 2014 (10 pgs).

*Primary Examiner* — Mirza F Alam
(74) *Attorney, Agent, or Firm* — Brooks, Cameron & Huebsch, PLLC

(57) ABSTRACT

Devices, systems, and methods for providing predictive analytics of fire systems are described herein. One fire system maintenance system, includes fire system detectors, a fire system control panel, and a gateway device positioned within the facility and in communication with at least one of the fire system control panel or fire system detectors, the gateway having instructions to: collect fire system device health data associated with one or more fire or smoke detector devices and to send this fire system device health data to a remote device; the remote device having instructions to: analyze the collected fire system device health data to predict if the data contains any anomalies or deviations from an expected behavior; and a fire system maintenance solution application that identifies a nearest scheduled maintenance visit and associates a service item with the scheduled maintenance visit.

20 Claims, 6 Drawing Sheets

(56) References Cited

U.S. PATENT DOCUMENTS

| | | | |
|---|---|---|---|
| 2007/0208438 A1* | 9/2007 | El-Mankabady | G05B 15/02 |
| | | | 700/83 |
| 2009/0228812 A1* | 9/2009 | Keenan, Jr. | H04L 67/34 |
| | | | 715/762 |
| 2017/0032661 A1* | 2/2017 | Moffa | G08B 29/145 |
| 2018/0204435 A1 | 7/2018 | Hilsinger et al. | |
| 2021/0027613 A1 | 1/2021 | Sahai et al. | |
| 2021/0350692 A1 | 11/2021 | Nalukurthy et al. | |

* cited by examiner

US 11,984,016 B2

PREDICTIVE ANALYTICS OF FIRE SYSTEMS TO REDUCE UNPLANNED SITE VISITS AND EFFICIENT MAINTENANCE PLANNING

TECHNICAL FIELD

The present disclosure relates to devices, systems, and methods for providing predictive analytics of fire systems to reduce unplanned site visits and efficient maintenance planning.

BACKGROUND

Facilities (e.g., buildings), such as commercial facilities, office buildings, hospitals, and the like, may have a fire detection system that can be triggered during an emergency situation (e.g., a fire) to warn occupants to evacuate. For example, a fire detection system may include a fire alarm control panel within the building and a plurality of detectors located throughout the building (e.g., on different floors and/or in different rooms of the building) that can sense things, such as a heat condition indicative of a fire, smoke particulate, and/or chemical compounds that are occurring in the building, that may be harmful to occupant, and provide a notification of the sensed condition to the occupants of the building and/or building monitoring personnel via alarms or other mechanisms.

Fire system technicians do periodic maintenance of fire systems in a building, sometimes as per regional regulatory recommendations. It has been observed that several times building owners reported an issue after periodic maintenance is completed, it might be due to failure of devices which were checked and were in acceptable working condition during the maintenance period but fell into a failure mode a few days after service.

This leads to a technician visiting the site again and fixing the issue which results in an unplanned site visit and causes extra maintenance cost. Typically, from our analysis a technician will have ~4 unplanned visits per building per year.

The traditional approach has been simply to visit sites when the customer reports problems to carry out a repair or accomplish replacement work which increases the number of site visits and the maintenance cost of the building.

In another problem, malfunction of detectors will lead to false and unwanted alarms being generated from the fire system. False alarms from remotely monitored fire detection and fire alarm systems cost businesses and Fire and Rescue Services (FRSs) an estimated £1 billion a year in the UK. FRSs in Britain received 584,500 callouts; 53.4% of which were false alarms. Considerable drain on fire authority resources, causes business disruptions (leading to a loss of productivity), and reduces the confidence of the general public in fire alarms.

DETAILED DESCRIPTION

Devices, systems, and methods for predictive analytics of fire systems to reduce unplanned site visits and efficient maintenance planning. The embodiments of the present disclosure provide preventative maintenance analytics for determining device inspection, maintenance, and/or replacement periods for a fire system and, based on that information, a scheduling utility can schedule to address those issues when a service technician will be on site at a facility.

The embodiments of the present disclosure also provide event pattern analytics for determining facilities and/or service events that generate the most service visits and, based on that information, a scheduling utility can associate service items with a technician's schedule to address those issues when a service technician will be on site at a facility. The embodiments of the present disclosure also provide device anomaly analytics for determining potential for system device failure and/or false alarm timeframes and, based on that information, a scheduling utility can associate service items with a technician's schedule to address those issues when a service technician will be on site at a facility.

Further, where multiple buildings are being serviced, the embodiments of the present disclosure provide cross building data analytics for determining which buildings generate the most false alarms and/or which buildings generate the most trouble events and, based on that information, a scheduling utility can associate service items with a technician's schedule to address those issues when a service technician will be on site at a facility.

In some embodiments, the gateway functionality can be provided by communication components (e.g., a transmitter and/or receiver) within the detector devices. For example, an aspiration detector device can include a number of communication components that provide transmission and reception capabilities in order for detector data to be passed out of the detector device and instructions and updates to be passed to the detector device, for instance from memory locations in a cloud environment, configuration or commissioning tools, and/or a software application for analyzing detector data and providing analytics about the fire system located on a non-mobile or mobile remote device.

Figure 2:
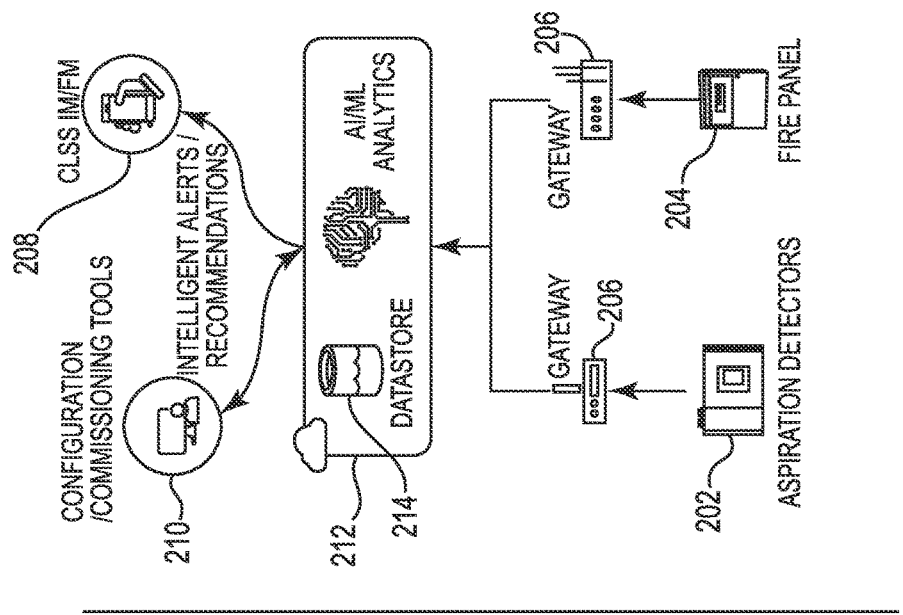
FIG. 2 is an example of a fire alarm system where the detection of a smoke or fire condition is determined at a central location at a facility in accordance with one or more embodiments of the present disclosure.

Also, in some embodiments, detector devices can communicate with other components of the system without communicating through the fire panel. Such an example is illustrated in FIG. 2 where the detector devices and the fire panel communicate through different gateways.

Although the cloud environment is referenced herein, the cloud environment can be implemented by an external communication connection from the detector devices and/or fire panel at a facility being monitored to a remote server that is remote (not located at) from the facility. In some embodiments, this remote arrangement allows the remote server (e.g., cloud server) to provide similar services described herein to multiple fire systems at multiple facilities for, potentially, multiple different facility owners.

As discussed, the embodiments of the present disclosure propose a predictive and/or preventive maintenance solution which monitors performance of a fire system to predict faults and failures, among other functions. For example, the fire system maintenance solution alerts an operator when detector performance has become degraded and requires recalibration, adjustment, or replacement of a component of a detector device or the entire detector device. The solution can be integrated with a Connected Life Safety Solution (CLSS) that offers a fire system as part of its CLSS.

In this solution, a gateway device will periodically collect device health data, such as obscuration level, Drift %/Drift Compensation %, Alarm sensitivity levels, Peak %, Percent of Alarm, etc. and send the collected data to a remote device such as a cloud server. (e.g., periodicity could be any suitable period, such as once in a day). Different types of analytics are carried out on this data to predict anomalies, alert technicians, and report those anomalies when to a technician when the technician is scheduled for a site visit, for example, for regular maintenance.

Anomaly detection can be utilized to determine if one or more devices are exhibiting an anomaly in their data. For example, by benchmarking devices within each zone, a system of the present disclosure can identify if any smoke detector has a much higher dust accumulation (e.g., beyond a threshold value of an average of those devices in the zone) as compared to other smoke detectors in the same zone.

Embodiments of the present disclosure can also identify devices which might require maintenance in the near future and provide an estimated time of maintenance. This information can then be used to add this task to a list of tasks to be accomplished by a technician that is scheduled to be at the facility at or near that timeframe.

Predictive analytics can be provided to project when a detector drift compensation and/or dust accumulation level will reach beyond acceptable threshold or outside a range of acceptable values. Such embodiments enable the fire system maintenance solution to do better at planning of upcoming regular maintenance by including predicted actions that may occur at or near the timeframe of the scheduled maintenance visit to the facility. Some embodiments of the present disclosure can also bring intelligent analysis reports on buildings using unusual patterns and eases handover of sites during fire system maintenance management changes. Embodiments of the present disclosure can also shift management of a facility from unplanned to planned, condition-based maintenance, wherein, when a condition is met (e.g., identification of an anomaly), service is to be performed.

Embodiments of the present disclosure can combine predicted maintenance faults as part of a regular building inspection schedule and thereby reduce number of site visits. Such an implementation can save on unexpected truck rolls, when one or more service trucks are dispatched to a facility. For example, by predicting an estimated number of faults that can be combined with an upcoming inspection schedule the fire system maintenance solution application can provide an indication of the number of truck rolls that can be reduced. This feature reduces the number of false or unwanted alarms and/or can reduce the cost of fees from a fire brigade response to attend to false alarms. The type of data obtained by the dedicated software can, for example, be volatile integer data representing environment temperature at a zone within a facility (e.g., a room within a building).

Additionally, this data can be stored in random access memory (RAM) and used for fire alarm system maintenance scheduling or, at application level, stored into a non-volatile RAM (NVRAM) for diagnostic purposes to evaluate whether an anomaly is present at a device using different types of algorithms (e.g., average, mode, etc.). This layer can be provided, for example, to one or more of the remote devices.

In this detailed description, reference is made below to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

Figure 1:
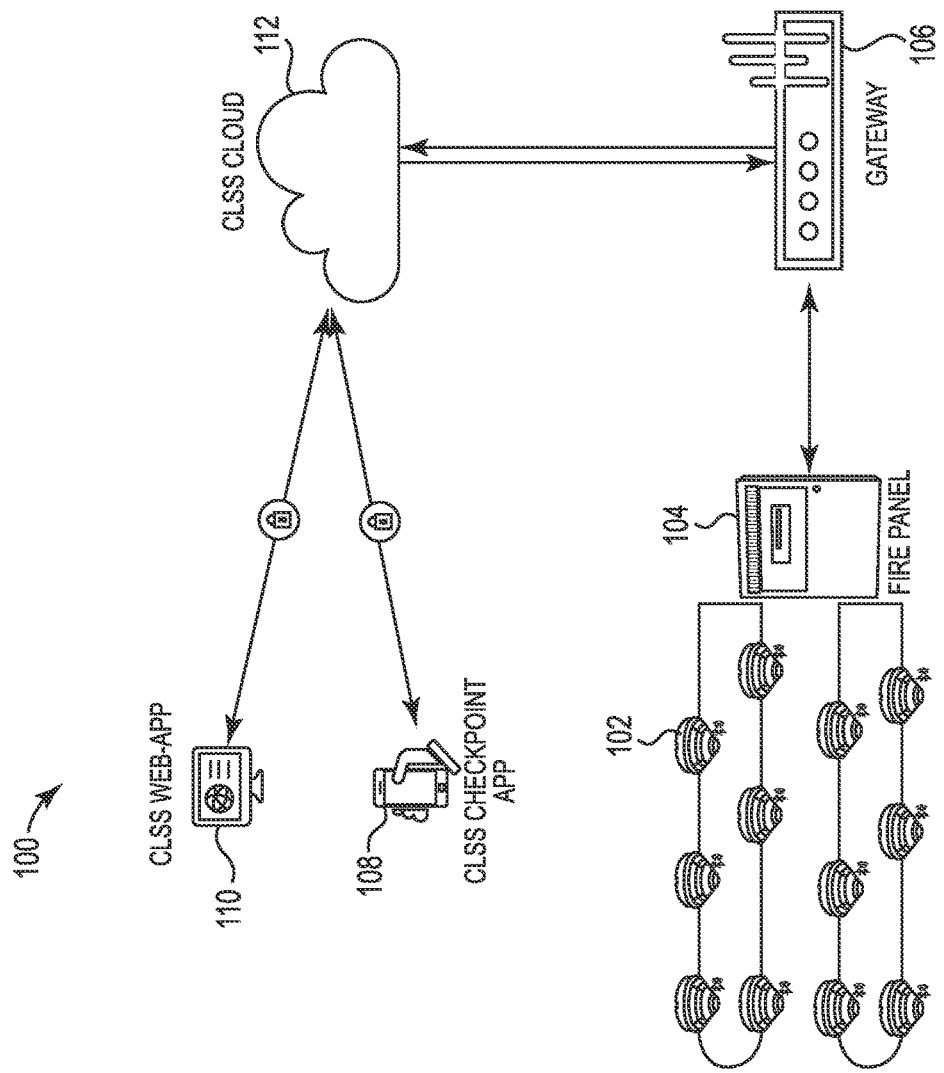
FIG. 1 is an example of a fire alarm system where the detectors are disbursed around a facility in accordance with one or more embodiments of the present disclosure.

FIG. 1 is an example of a fire alarm system where the detectors are disbursed around a facility in accordance with one or more embodiments of the present disclosure. FIG. 1 includes a fire system maintenance system 100, including a number of fire system detectors 102 (fire system devices) positioned on-premise (i.e., within a facility having a fire alarm system therein), a fire system control panel 104 positioned within the facility, and a gateway device 106 positioned within the facility and in communication with at least one of the fire system control panel 104 or fire system detectors 102.

The gateway device 106 includes a processor and memory, with the memory having instructions and data stored therein. The instructions are executable by the processor to collect fire system device health data associated with one or more fire or smoke detector devices and to send this fire system device health data to a remote device.

The remote device is located remotely off-premise (i.e., not within the facility) from the facility and has a processor and memory. A suitable remote device can be a mobile device 108, such as a mobile phone, tablet, watch, or laptop, or a non-mobile device 110, such as a desktop computing device or server computing device that hosts or provides access to the software application for fire system maintenance or provides storage and/or analysis of collected fire system device health data, such as a cloud server 112 or other remote device 108 and/or 110.

The memory of one of the one or more remote devices can have instructions and data stored therein with the instructions being executable by the processor thereon to analyze the collected fire system device health data to predict if the data contains any anomalies or deviations from an expected behavior; and a fire system maintenance solution application that, if an anomaly or deviation is found, identifies a nearest in time scheduled maintenance visit to be performed by a fire system device technician and associates a service item with the scheduled maintenance visit to provide service by the technician to repair, update, or replace a fire system device based on the determined anomaly or deviation. For example, if an anomaly or deviation is detected, the system checks a maintenance schedule to see if a maintenance appointment is scheduled and adds a service item to that appointment to have the technician, sent to the facility for the appointment, resolve the issue associated with the service item.

As discussed above, the remote device can be a mobile or non-mobile device and can perform the analyzing, identifying, and associating functions discussed above. For example, such functions can be accomplished by a fire system maintenance solution application provided on the remote device or via a web browser/portal allowing access to the application on the remote device. In some embodiments, a server, such as a cloud server can host the fire system maintenance solution application and access to the fire system maintenance solution application can be provided via a remote device, such as mobile device 108 or non-mobile device 110, via a software application resident on the remote device 108 or 110 or via an Internet accessible application (web browser/portal) accessed through the remote device 108 or 110.

FIG. 2 is an example of a fire alarm system where the detection of a smoke or fire condition is determined at a central location at a facility in accordance with one or more embodiments of the present disclosure. FIG. 2 provides a different implementation wherein the system includes multiple gateway devices 206 and the remote devices 208, 210, and 212 provide additional functionalities. In this implementation, the detector(s) 202 have their own gateway device that communicates with the remote devices. Although shown outside of the devices 202 and panel 204 in the embodiment of FIG. 2, the gateway functionality may be located within the devices 202 and/or panel 204, thereby eliminating a physically separate gateway device.

As with its implementation in FIG. 1 at 112, the remote device 212 includes a processor and memory therein. The memory can include a datastore 214 for storing data collected from the fire system devices and/or for operating the fire system maintenance solution application. The fire system maintenance solution application can, for example, be stored in memory on the remote device 212 including executable instructions and data to perform its functions as described in more detail below. The functionalities of configuration and/or commissioning tools, intelligent alerts and/or recommendations, and analytics processing and/or display can be provided on any of the remote devices 208, 210, and/or 212.

Figure 3:
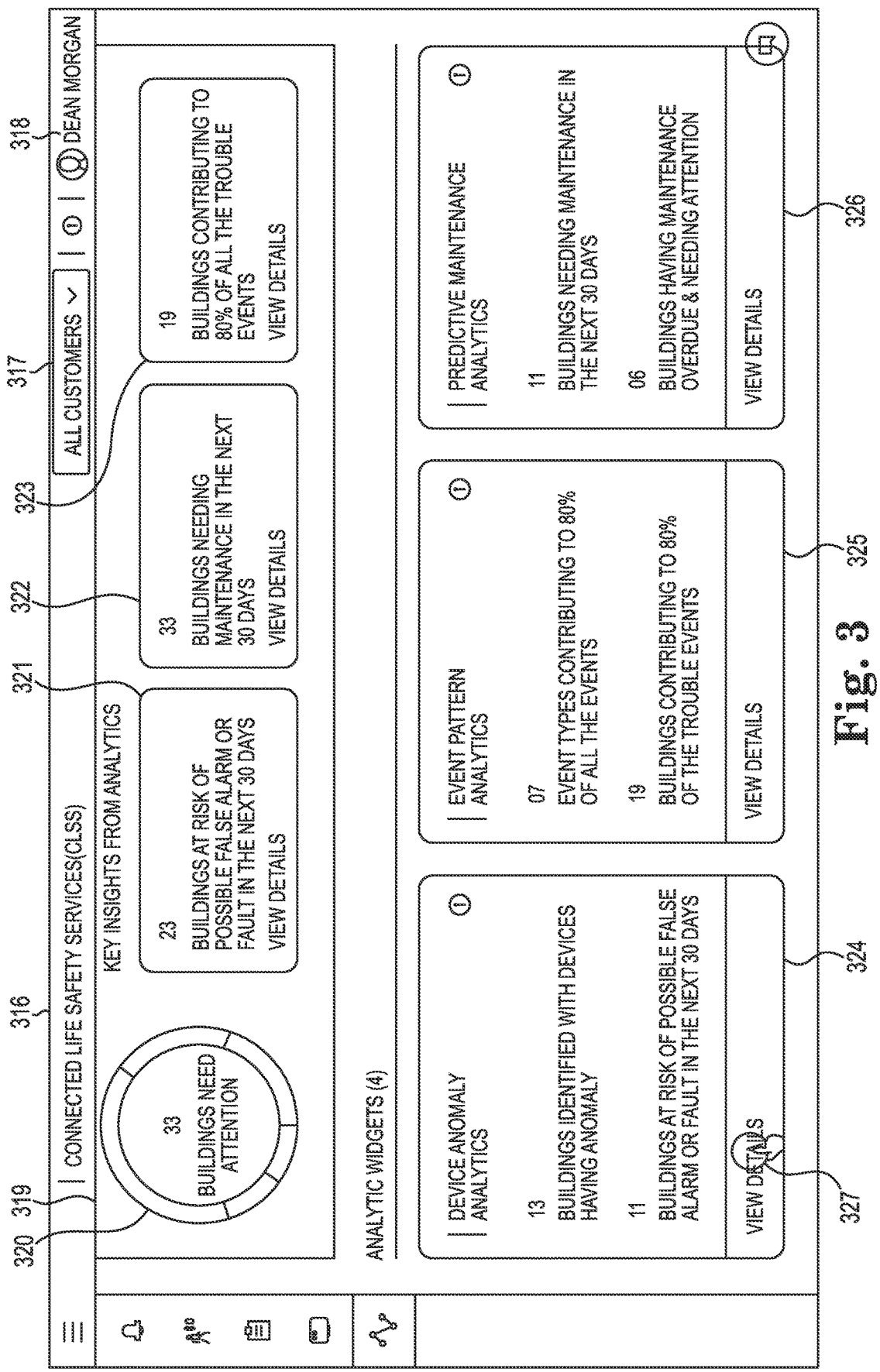
FIG. 3 is an example of a display providing information to a fire system user on a remote device in accordance with one or more embodiments of the present disclosure.

FIG. 3 is an example of a display providing information to a fire system user on a remote device in accordance with one or more embodiments of the present disclosure. In FIG. 3, one screen of the fire system maintenance solution application is shown. The fire system maintenance solution application allows a user, such as a service scheduler or service technician to see various information about one or more facilities managed by the fire system maintenance solution application (belonging to one entity or multiple entities), a specific facility, buildings within the facility, and/or devices with a building of the facility.

On the screen, illustrated in the embodiment of FIG. 3, the display 316 shows that a particular user 318 can log in to the system, for example via remote device 108/208 or 110/210 of FIGS. 1 and 2. In this manner, the fire system maintenance solution application can access data about the logged in user (Dean Morgan) and configure the screen to include information specific to one or more of the user's customers.

In this example, the screen is displaying information about all of the user's customers, but the display 316 includes a selector 317 that allows the user to select one or more customer's data to include in the analysis of data. This selection will limit the data analyzed by the system to those customers selected by the user. Selecting more than one customer can be beneficial, for example, to determine whether there are processes or procedures that are causing untimely service visits, device breakdowns or other device issues, and/or false alarms by the fire system.

In this manner, the system providing the fire system maintenance solution and associated service processes and procedures can be improved. In some embodiments, the system can analyze the collected data and automatically identify issues and make improvements to its processes and procedures for service visits, for example, through use of machine learning/artificial intelligence implemented by the processor through execution of instructions stored in memory.

In the illustrated embodiment, a key insights section 319 is presented that allows the user to identify some analytical data that may be of interest to them. Shown in the example are the number of buildings needing attention (33 buildings) 320, buildings at risk of a possible false alarm or fault during a particular time period (23 buildings in a 30 day period) 321 (e.g., for all time periods and percentages discussed herein, they can be set by the user or provider of the fire system maintenance solution application and can be the same or different from each other), buildings needing maintenance during a particular time period (33 buildings in a 30 day period) 322, and buildings contributing to a percentage of all trouble events (80%) 323 (e.g., percentage can be set by the user or provider of the fire system maintenance solution application or can be a movable percentage, such as the building producing the largest percentage of total trouble events). A user can select any of these displayed areas (320, 321, 322, 323) to see more detailed information/data about the area selected.

Also included in the areas presented on the screen 316 are a number of areas regarding device anomaly analytics 324, event pattern analytics 325, and predictive maintenance analytics 326. In some embodiments of the present disclosure, the user or provider of the fire system maintenance solution application can select which information from the system to present on screen 316 and the arrangement of the different areas depicting that information. In this manner, the screen may be customized to best suit a particular user or use of the fire system maintenance solution application (e.g., focus the information on general, non-customer specific information versus focusing on a particular customer's service processes and procedures).

The information depicted in the example implementation of the device anomaly area 324 illustrated in FIG. 3 includes buildings identified with devices having an anomaly (13 devices) and buildings at risk of possible false alarm or fault during a particular time period (11 buildings in a 30 day period). Anomaly detection can be accomplished in any suitable manner, for example, an anomaly can be detected by comparing data collected (e.g., at a present time) from a particular device within the building and comparing that data with data collected from that device at a previous time or during a previous time period. This and other comparative data discussed herein can, for example, be stored in memory on a system device and accessed by the fire system maintenance solution application. An anomaly can also be identified by comparison of the collected data with data from one or more other devices (e.g., one or more devices of a group of customers, a particular customer, a particular facility, a particular building, or an area within a particular building). An anomaly can also be identified by comparison of the collected data with a threshold value or to a range of values as discussed in more detail below with respect to FIGS. 5-7.

The risk of a false alarm or fault can be determined in any suitable manner. For example, the identification of an anomaly can be one factor in determining whether a false alarm or fault will occur during a particular time period. Further, in some implementations, the system can have access to service records that can provide information about the health condition of a particular fire system device and this information can be compared to maintenance, repair, and/or replacement timeframes for one or more components of the device and/or the device itself to determine a likelihood of a false alarm or fault occurring within a particular time period.

The information depicted in the example implementation of the event pattern analytics area 325 illustrated in FIG. 3 includes the event types contributing to a particular percentage (80%) of all events (7 event types) and buildings contributing to a particular percentage (80%) of the trouble service events (19 buildings).

In some embodiments, the multiple types of service events can be tracked and that information saved in memory. The collected and saved data can then be analyzed to identify how many service items of each type are occurring over a time period and/or the event types contributing to a particular percentage of all service related events.

Likewise, data can be collected from the fire system devices from a number of buildings and this data can be saved in memory and then analyzed to determine the buildings contributing to a particular percentage of the trouble service events as a group and/or individually. For such an embodiment, the percentage of a total number of false alarms can be calculated, for example, by collecting fire system device health data for multiple devices over a period of time and analyzing the collected data to determine a percentage value for how much each building in the facility contributes to a total number of false alarms.

Additionally, how much each building in the facility contributes to a total number of service items can be calculated. For example, this could be accomplished by collecting fire system device health data for multiple devices over a period of time and analyzing the collected data to determine a percentage value for how much each building in the facility contributes to a total number of service items.

The information depicted in the example implementation of predictive maintenance analytics 326 illustrated in FIG. 3 includes buildings needing maintenance in a particular period of time (11 buildings) and buildings having maintenance overdue and needing attention (6 buildings). To determine what buildings need maintenance, as discussed above, in some implementations, the system can have access to service records that can provide information about the health condition of a particular fire system device or component of a fire system device and this information can be compared to maintenance, repair, and/or replacement timeframes for one or more components of the device and/or the device itself to determine whether a particular building will need maintenance within a particular time period. In some implementations, these records can be obtained from data collected from the fire system devices or stored in memory on a gateway device and/or remote device. Such data can also be analyzed to determine if maintenance is overdue. It should also be noted that a user of the system may view additional detail of any of the areas 321, 322, 323, 324, 325, or 326 by selecting that area as illustrated at 327.

Figure 4:
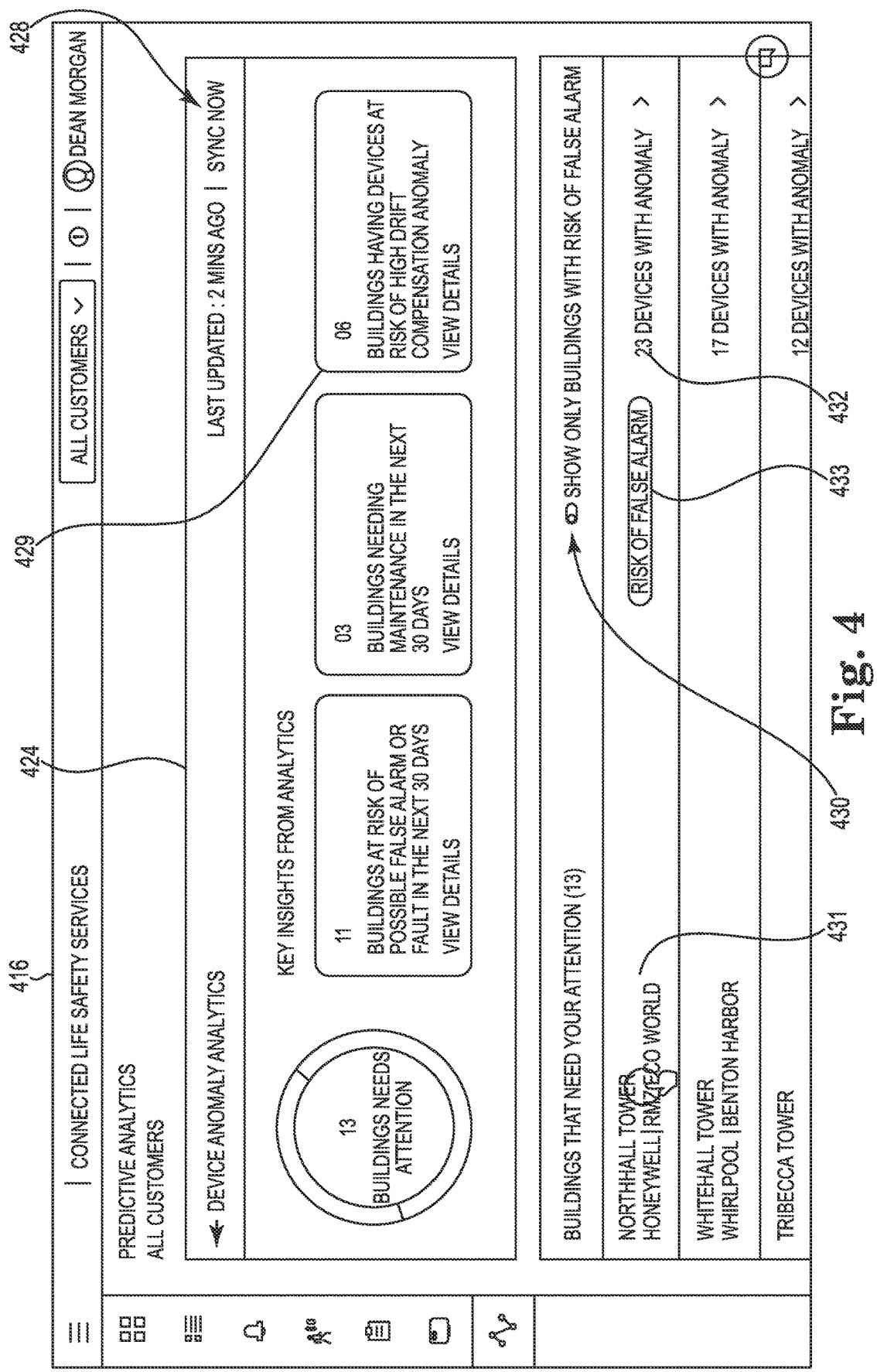
FIG. 4 is an example of a display providing information to a fire system user on a remote device in accordance with one or more embodiments of the present disclosure.

FIG. 4 is an example of a display providing information to a fire system user on a remote device in accordance with one or more embodiments of the present disclosure. FIG. 4 illustrates a screen 416 with additional detail that could, for example, be displayed to a user when the device anomaly analytics area 324 of the screen displayed in FIG. 3 is selected.

In the illustrated embodiment of FIG. 4, the screen includes analytics regarding device anomalies at 424. In some implementations, the system can allow for the user to see how old the data is and/or enable the user to update the data in real time at 428. This will allow the user to have confidence that the data and scheduling therefrom will be accurate, among other benefits.

As with the first screen, the screen 416 can be configured to include a key insights section. Here, two areas are the same as on the screen 316, but one area includes buildings having devices at risk of high drift compensation at 429, described in more detail below. As discussed, the screen may be configured differently for different users and, therefore, the areas on screens 316 and 416 may be the same or different, or arranged the same or differently.

Also included on the screen is a list of buildings 431 that need attention including those of two different customers (e.g., Honeywell and Whirlpool) since the screen indicates this list is for all customers. For each building an indicator 432 indicates how many devices within the building are identified as having an anomaly.

Further, this embodiment also includes an identifier that there is a risk of false alarm 433. This feature may be helpful in aiding the user to quickly identify which devices should be serviced first to avoid other adverse issues, such as a false alarm notification being issued, which could result in dispatching emergency personnel, among other issues.

Additionally, some embodiments may include a mechanism to select high priority items from the list 430. In this example, a selection switch can be enabled to only show buildings with service items indicating a risk of false alarm, however, other embodiments can filter using other high priority items.

Figure 5:
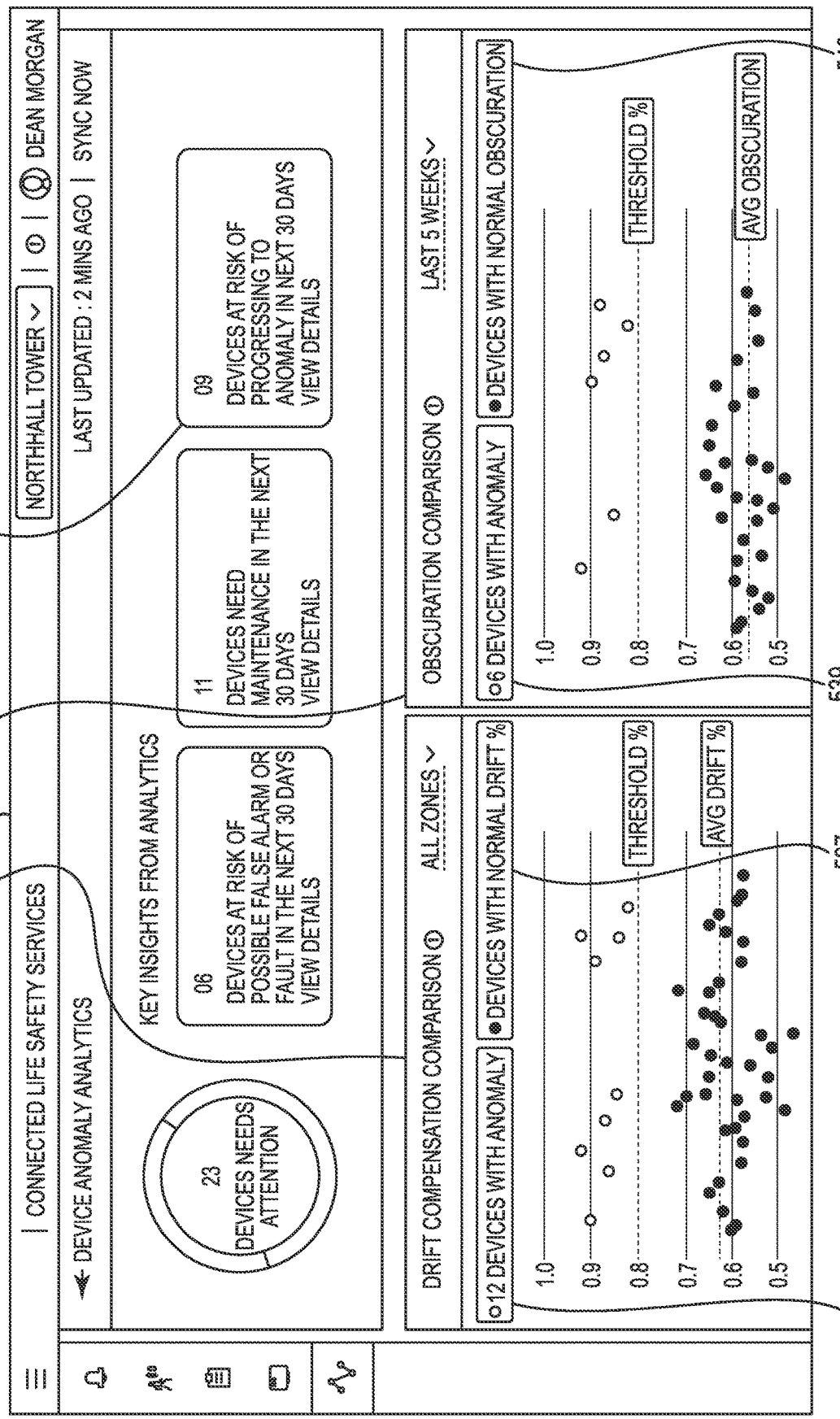
FIG. 5 is an example of a display providing information to a fire system user on a remote device in accordance with one or more embodiments of the present disclosure.

FIG. 5 is an example of a display providing information to a fire system user on a remote device in accordance with one or more embodiments of the present disclosure. FIG. 5 illustrates a screen 516 with additional detail that could, for example, be displayed to a user when the area representing a building called Northhall Tower is selected from the list of buildings 431 on the screen displayed in FIG. 4.

In the embodiment of FIG. 5, the screen has a key insights section and here a new area is provided allow the user to select more detail about the devices that have a risk of progressing to have an anomaly within a period of time (9 devices) 534. This can be helpful, for example, in adding a service item to a list of items for a technician to address on-premise at a facility before the device has an anomaly. For instance, a technician may be scheduled to visit a building in two days. A functionality such as that of area 534 can identify service issues that may result in an anomaly within 30 days and have the service technician resolve those issues before an anomaly arises. This is beneficial because it can reduce the number of unscheduled visits made to the facility by the technician.

The screen 516 includes additional detail regarding device anomaly analytics not shown on the screen in FIGS. 3 and 4. On this screen 516, a drift compensation comparison 535 and an obscuration comparison 538 are provided to the user via the display of a remote device (e.g., user's mobile phone).

Drift typically occurs with sensors as they age. As used herein a drift can represent a deviation of a sensor value measured by a sensor within the detector device that is beyond a threshold value or that is outside a range of values. For example, the detection of anomalies can be accomplished by comparing the collected fire system device health data from a particular sensor or device to the collected fire system device health data from other sensors or devices, as shown in FIG. 5, to identify any values that are outside a range of values or beyond a threshold.

In the example of FIG. 5, devices are compared (e.g., individually or in groups) to determine whether a drift condition is beyond a threshold value (e.g., 0.8%). In this implementation, devices with unacceptable drift are presented at 536 and those with acceptable drift are presented at 537. In the fire system maintenance solution application, the devices marked at 536 could be identified as having an anomaly and, thereby, a service call to address the condition is necessary and this service item should be added to a technician's maintenance items for an upcoming visit.

Also shown in this example are analytics showing devices being compared (e.g., individually or in groups) to determine whether a level of obscuration is beyond a threshold value (e.g., 0.8%). In this implementation, devices with unacceptable obscuration are presented at 539 and those with acceptable obscuration are presented at 540. Such a grouping can, in some embodiments, be analyzed to determine a range of values (e.g., based on high and low values, distance from an average, etc.) that are acceptable and such a range can be used to determine whether the data indicates an anomaly.

In the fire system maintenance solution application, because they are beyond a particular threshold configured to determine anomalies, the devices marked at 536 would be identified as having an anomaly and, thereby, a service call to address the condition is necessary. This service item would be added to a technician's maintenance items for an upcoming visit. As used herein an obscuration level that produces an anomaly is a measure of dust accumulation within a detector device (e.g., in an aspirated smoke detector) that is beyond a threshold.

Figure 6:
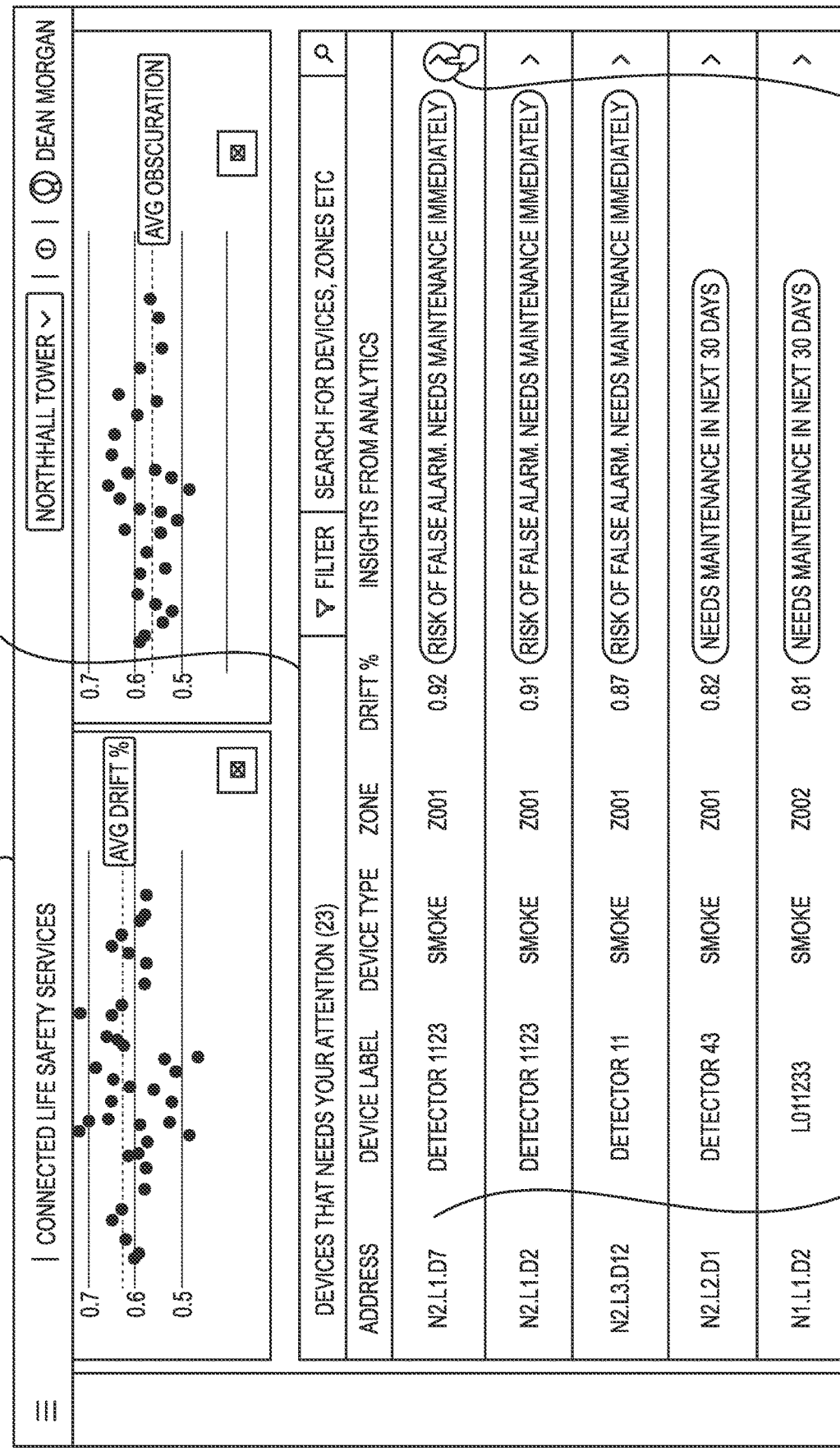
FIG. 6 is an example of a display providing information to a fire system user on a remote device in accordance with one or more embodiments of the present disclosure.

FIG. 6 is an example of a display providing information to a fire system user on a remote device in accordance with one or more embodiments of the present disclosure. The illustration in FIG. 6 is additional information that can either be on its own screen or on screen 516 of FIG. 5. Here, screen 616 shows a listing 641 of devices 642 needing attention. It provides even more detail about the devices needing attention, by providing identification information, such as the device address and/or label, the device type, the zone within the facility in which the device is located, the drift value, and/or the service issue that needs to be resolved. By selecting a device from the list at 643, the user can see even more detail of the device selected which is shown in FIG. 7.

Figure 7:
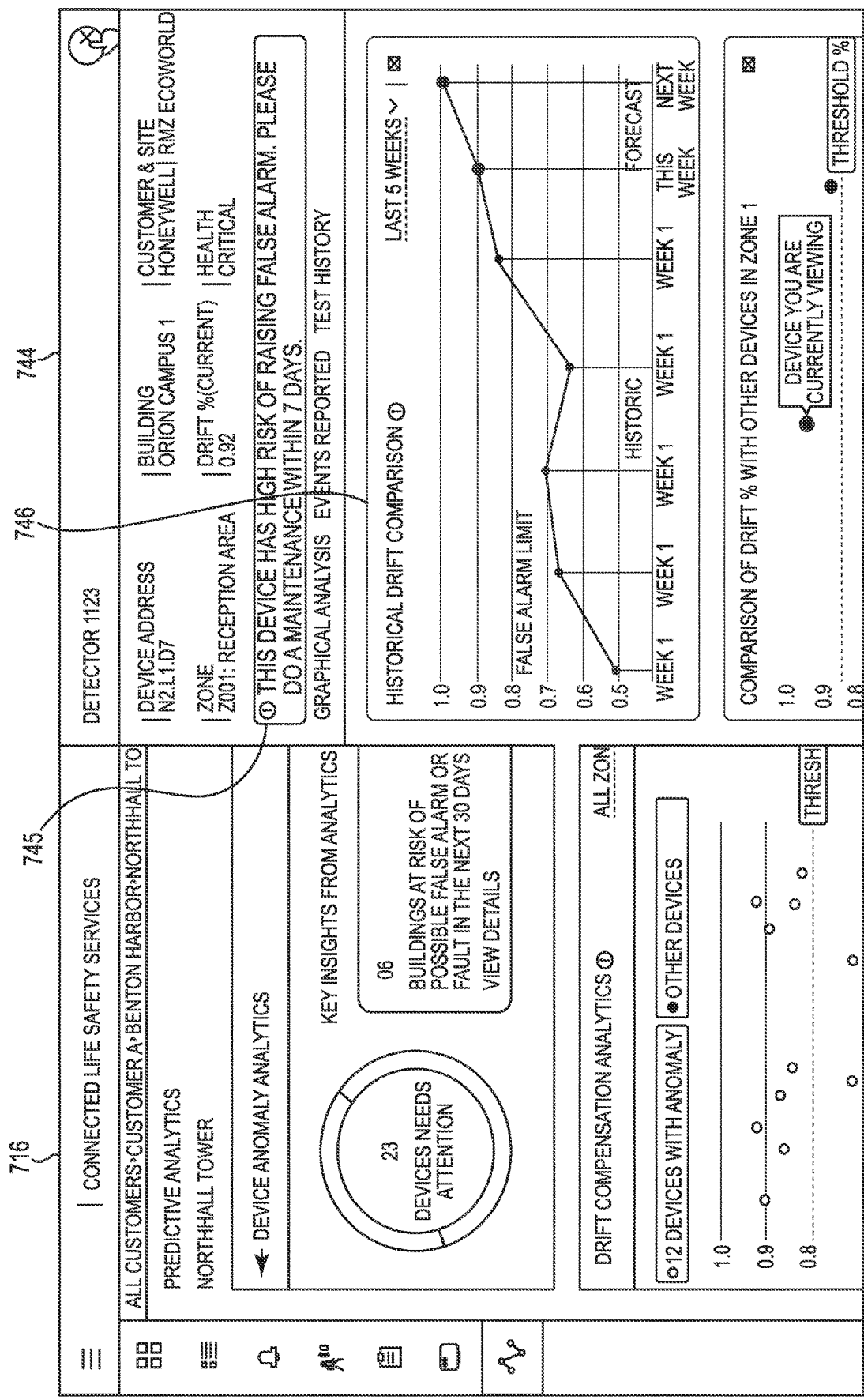
FIG. 7 is an example of a display providing information to a fire system user on a remote device in accordance with one or more embodiments of the present disclosure.

FIG. 7 is an example of a display providing information to a fire system user on a remote device in accordance with one or more embodiments of the present disclosure. In this example, the new information about the device is provided in a pop-up screen 744 overlayed on the prior screen 616/716. Any suitable display method may be utilized to convey the information described by the embodiments of the present disclosure.

The additional device information can be helpful for the technician to locate and diagnose the service item. This can be particularly beneficial when the fire system maintenance solution application is provided on a mobile device that can be carried/worn by the technician.

Any suitable information about the device or its status can be provided on this screen. In the example of FIG. 7, the information includes device address, customer identification (customer name), facility (site) in which the device is located, building in which the device is located, a defined area (zone) within the building in which the device is located, draft value, and a health status indicator (critical) that identifies a classification of the health status of the device for sorting those devices needing more immediate assistance.

In some embodiments, the screen 744 can include an alert indicator 745 that indicates to a user that a service issue needs to be resolved. This indicator can stand out due to its position, size of font, bold text, color of text, or other suitable indicator type that will stand out to a user when viewing the screen.

The screen also includes information about the health status of the device. For example, the screen includes graphical analysis of the collected data, a description of events reported by the fire system maintenance application, and the operational test history for the device. As illustrated, the graphical analysis can include a number of different graphs. Two examples of such graphs are shown. The first is a historical comparison of drift over a period of time (5 weeks). A graph can also be used to illustrate estimated future conditions. For example, as illustrated in FIG. 7, the graph can additionally or alternatively include forecast drift values to help the user understand potential timing of a drift related anomaly and severity of the issue in the future.

The second graph is a comparison of drift with other devices (within zone 1). In such an embodiment, the device can also be compared with a threshold or range of values to provide the user with some perspective as to how this particular device compares to the values of other devices and the threshold or range. Such graphs can be beneficial to the user in determining when to schedule service items, what devices to include in a maintenance visit as the user can see the relationship of the values of multiple devices and their proximity to a threshold at present and estimated in the future over a time period.

Provided below are two additional embodiments of the present disclosure, one is a fire system maintenance solution device and the other is a method embodiment.

In this fire system maintenance solution device embodiment, the device collects fire system device health data associated with one or more fire or smoke detector devices and sends this fire system device health data to a remote device; the remote device located physically off-premise remotely from the facility and having a processor and memory, the memory having instructions and data stored therein, the instructions being executable by the processor to: analyze the collected fire system device health data to predict if the data contains any anomalies or deviations from an expected behavior; and if an anomaly or deviation is found, identifies a nearest in time scheduled maintenance visit to be performed by a fire system device technician and associates a service item with the scheduled maintenance visit to provide service by the technician to repair, update, or replace a fire system device based on the determined anomaly or deviation. In some such embodiments, the instructions further include wherein the remote device checks a calendar or list of upcoming service events for a particular fire system device and identifies any service items that will arise within a threshold period after the nearest in time scheduled maintenance visit to be performed by a fire system device technician and associates any identified service items within that threshold period with the scheduled maintenance visit to provide service by the technician to repair, update, or replace a fire system device based on the identified service item. In this manner, the technician can more efficiently service the facility as a maintenance visit will include items that are not currently required but, for example, may be required between the present visit (nearest in time scheduled visit) and the following scheduled visit, which may be weeks or months away.

In some embodiments, the deviation referenced above can be a predicted sensor drift of a value measured by a sensor within the detector device that is predicted to be beyond a threshold value or outside a range of values within a period of time from the particular scheduled maintenance visit. Another example is where the anomaly is a predicted dust accumulation within the detector device that is predicted to be beyond a threshold value within a period of time from the particular scheduled upcoming maintenance visit. In another example, the anomaly is a predicted risk value of a possible false alarm from the detector device that is predicted to be beyond a threshold value within a period of time from the particular scheduled maintenance visit. In these instances, a service item to resolve the issue can be associated with the nearest in time scheduled maintenance visit, that has not yet occurred.

The method embodiment includes: receiving, via an off-premise remote device, fire system device health data, collected from an on-premise gateway device of a fire system within a facility, associated with one or more on-premise fire or smoke detector devices; analyzing, via executable instructions on the off-premise remote device, the collected fire system device health data to predict if the data contains any anomalies or deviations from an expected behavior; and if an anomaly or deviation is found, identifying, via a fire system maintenance solution application, a particular scheduled maintenance visit to be performed by a fire system device technician and associates a service item with the particular scheduled maintenance visit to provide service by the technician to repair, update, or replace a fire system device based on the determined anomaly or deviation.

In some embodiments, the method further includes periodically reviewing, via executable instructions on the off-premise remote device, the associations of service items and determining whether these service items should be added to a regular scheduled maintenance visit list of tasks. In this way, the scheduled maintenance process can be improved as the system learns more through experience doing the scheduled maintenance process for more facilities or buildings. Such a periodic review of the associations of service items and determining whether these service items should be added to a scheduled maintenance visit list of tasks can be accomplished, for example, by tracking a number of occurrences value of a particular service item and determining whether that value is beyond a threshold service item occurrence value.

As discussed, the embodiments of the present disclosure propose a predictive and/or preventive maintenance solution which monitors performance of a fire system to predict faults and failures, among other functions. Such features can be very beneficial in servicing fire systems and maintaining fire system reliability, among other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:
1. A fire system maintenance system, comprising:
a number of fire system detectors positioned within a facility;
a fire system control panel positioned within the facility;
a gateway device positioned within the facility and in communication with at least one of the fire system control panel or fire system detectors, the gateway having a processor and memory, the memory having instructions and data stored therein, the instructions being executable by the processor to:
collect fire system device health data associated with one or more fire or smoke detector devices and to send this fire system device health data to a remote device;
the remote device located remotely from the facility and having a processor and memory, the memory having instructions and data stored therein, the instructions being executable by the processor to:
analyze the collected fire system device health data to predict if the data contains any anomalies or deviations from an expected behavior; and
a fire system maintenance solution application that, if an anomaly or deviation is found, identifies a nearest in time scheduled maintenance visit to be performed by a fire system device technician and associates a service item with the nearest in time scheduled maintenance visit to provide service by the technician during the nearest in time maintenance visit to repair, update, or replace a fire system device based on the determined anomaly or deviation.

2. The fire system maintenance system of claim 1, wherein the remote device is a mobile device and where the analyzing, identifying, and associating functions are provided by a fire system maintenance solution application provided on a mobile device.

3. The fire system maintenance system of claim 1, wherein the analyzing, identifying, and associating functions are provided by a fire system maintenance solution application that is provided as an Internet accessible application.

4. The fire system maintenance system of claim 1, wherein the anomaly is a dust accumulation within one of the detector devices that is beyond a threshold.

5. The fire system maintenance system of claim 1, wherein the deviation is a sensor drift of a value measured by a sensor within one of the detector devices that is beyond a threshold value.

6. The fire system maintenance system of claim 1, wherein the deviation is a sensor drift of a value measured by a sensor within one of the detector devices that is outside a range of values.

7. A fire system maintenance solution device, comprising:
receive collected fire system device health data associated with one or more fire or smoke detector devices of a facility with a remote device;
the remote device located remotely from the facility and having a processor and memory, the memory having instructions and data stored therein, the instructions being executable by the processor to:
analyze the collected fire system device health data to predict if the data contains any anomalies or deviations from an expected behavior; and
if an anomaly or deviation is found, identifies a nearest in time scheduled maintenance visit to be performed by a fire system device technician and associates a service item with the nearest in time scheduled maintenance visit to provide service by the technician during the nearest in time maintenance visit to repair, update, or replace a fire system device based on the determined anomaly or deviation.

8. The fire system maintenance solution device of claim 7, wherein the detecting of anomalies is accomplished by comparing the collected fire system device health data from a particular sensor to the collected fire system device health data from other sensors to identify any values that are outside a range of values.

9. The fire system maintenance solution device of claim 7, wherein the instructions further include wherein the remote device checks a calendar of service events for a particular fire system device and identifies any service items that will arise within a threshold period after the nearest scheduled maintenance visit to be performed by a fire system device technician and associates any identified service items within that threshold period with the scheduled maintenance visit to provide service by the technician to repair, update, or replace a fire system device based on the identified service item.

10. The fire system maintenance solution device of claim 7, wherein the deviation is a predicted sensor drift of a value measured by a sensor within the detector device that is beyond a threshold value within a period of time from the particular scheduled maintenance visit.

11. The fire system maintenance solution device of claim 7, wherein the deviation is a predicted sensor drift of a value measured by a sensor within the detector device that is outside a range of values within a period of time from the particular scheduled maintenance visit.

12. The fire system maintenance solution device of claim 7, wherein the anomaly is a predicted dust accumulation within the detector device that is beyond a threshold value within a period of time from the particular scheduled maintenance visit.

13. A method, comprising:
receiving, via an off-premise remote device, fire system device health data, collected from an on-premise gateway device of a fire system within a facility, associated with one or more on-premise fire or smoke detector devices;
analyzing, via executable instructions on the off-premise remote device, the collected fire system device health data to predict if the data contains any anomalies or deviations from an expected behavior; and
if an anomaly or deviation is found, identifying, via a fire system maintenance solution application, a particular scheduled maintenance visit by a fire system device technician and associates a service item with the particular scheduled maintenance visit to provide service by the technician during the particular maintenance visit to repair, update, or replace a fire system device based on the determined anomaly or deviation.

14. The method of claim 13, wherein the method further includes periodically reviewing, via executable instructions on the off-premise remote device, the associations of service items and determining whether these service items are added to a regular scheduled maintenance visit list of tasks.

15. The method of claim 13, wherein the method further includes periodically reviewing, via executable instructions on the off-premise remote device, the associations of service items and determining whether these service items are added to a scheduled maintenance visit list of tasks for the particular scheduled maintenance visit.

16. The method of claim 13, wherein periodically reviewing the associations of service items and determining whether these service items are added to a scheduled maintenance visit list of tasks is accomplished by tracking a number of occurrences value of a particular service item and determining whether that value is beyond a threshold service item occurrence value.

17. The method of claim 13, wherein the anomaly is a predicted risk value of a possible false alarm from the detector device that is beyond a threshold value within a period of time from the particular scheduled maintenance visit.

18. The method of claim 13, wherein the method further includes collecting fire system device health data for multiple devices over a period of time and analyzing the collected data to determine a percentage value for how much each building in the facility contributes to a total number of false alarms.

19. The method of claim 13, wherein the method further includes collecting fire system device health data for multiple devices over a period of time and analyzing the collected data to determine a percentage value for how much each building in the facility contributes to a total number of service items.

20. The method of claim 13, wherein there are multiple types of services items and wherein the method further includes analyzing the associated service items to determine how many service items of each type are occurring over a time period.

* * * * *